Nov. 30, 1965    L. E. ALVEY    3,220,287
PRECISION BORING BAR
Filed April 8, 1964

INVENTOR.
LEROY E. ALVEY
BY
ATTORNEY.

United States Patent Office 3,220,287
Patented Nov. 30, 1965

3,220,287
PRECISION BORING BAR
Leroy E. Alvey, Bridgeport, Conn., assignor to The Bullard Company, Bridgeport, Conn., a corporation of Connecticut
Filed Apr. 8, 1964, Ser. No. 358,321
2 Claims. (Cl. 77—58)

This invention relates to boring bars for machine tools, and particularly to an improved boring bar having means for providing ultra precision adjustment of the cutting tip thereof.

Prior known boring bars usually include means for supporting tool shanks of different length at the cutting end thereof. These shanks are provided with seats for receiving throw-away cutting tips, although shanks having permanent cutting tips are also employed. It often becomes necessary to adjust the position of the cutting edge of such tools to within very precise limits. Thus, in the use of throw-away or disposable cutting tips, the replacement or turning thereof to provide a sharp cutting edge often requires precise readjustment of the shank. Heretofore, such adjustments necessitated the setting up of elaborate gauging devices which consumed considerable time, thereby reducing the productive capacity of the mill to which the tool was applied.

The principal object of this invention is to provide a boring bar adapted to support a cutting tip in a manner to enable its cutting edge to be adjusted to within ultra precision limits without requiring elaborate gauging set-ups to insure such precise adjustments.

Another object of the invention is to provide such a boring bar in which the shank for the cutting tip is designed to cooperate with a precision gauge built into the boring bar.

Still another object of the invention is to provide such a boring bar in which the built-in precision gauge is protected against damage due to chips being formed during the boring operation.

Still another object of the invention is to provide such a boring bar in which the shank of the cutting tip includes an adjustable surface adapted to cooperate with the gauge.

In one aspect of the invention, a boring bar may have the usual tapered end or other type of connector for attaching it to a spindle of a machine tool. The bar may include a pocket or recess milled or otherwise formed in the body of the bar near its end opposite that provided with the taper.

In another aspect of the invention, a transverse passage may be provided through the bar, which passage communicates with the recess. The shank of a cutting tool may be slidingly received within said transverse passage, and said shank may include a shouldered portion along its length for cooperation with the heads of oppositely disposed, aligned screws that are threaded into oppositely disposed, aligned shoulders formed by recesses in the bar, which latter open into said transverse passage in said bar.

In still another aspect of the invention, the tool shank may be provided with seat means at one end for receiving throw-away cutting tips, although permanently attached tips may be employed.

In a further aspect of the invention, the shank of the tool may include a recessed portion that is located along a side of the shank and which opens into the recess in the bar, and an accurate gauge may be mounted within said bar recess such that its indicating finger extends downwardly into the recess in the shank.

In still another aspect of the invention, a screw may be threaded into a shoulder formed by the shank recess for cooperation with the pivotal indicating finger of the gauge.

In a still further aspect of the invention, a shield may be mounted in tracks about the body of the bar, for closing the recess therein within which the gauge is mounted in order to prevent dirt and chips from damaging the delicate gauge.

The above, other objects and novel features of the invention will become apparent from the following specification and accompanying drawing which are merely exemplary.

Figures 1, 2:
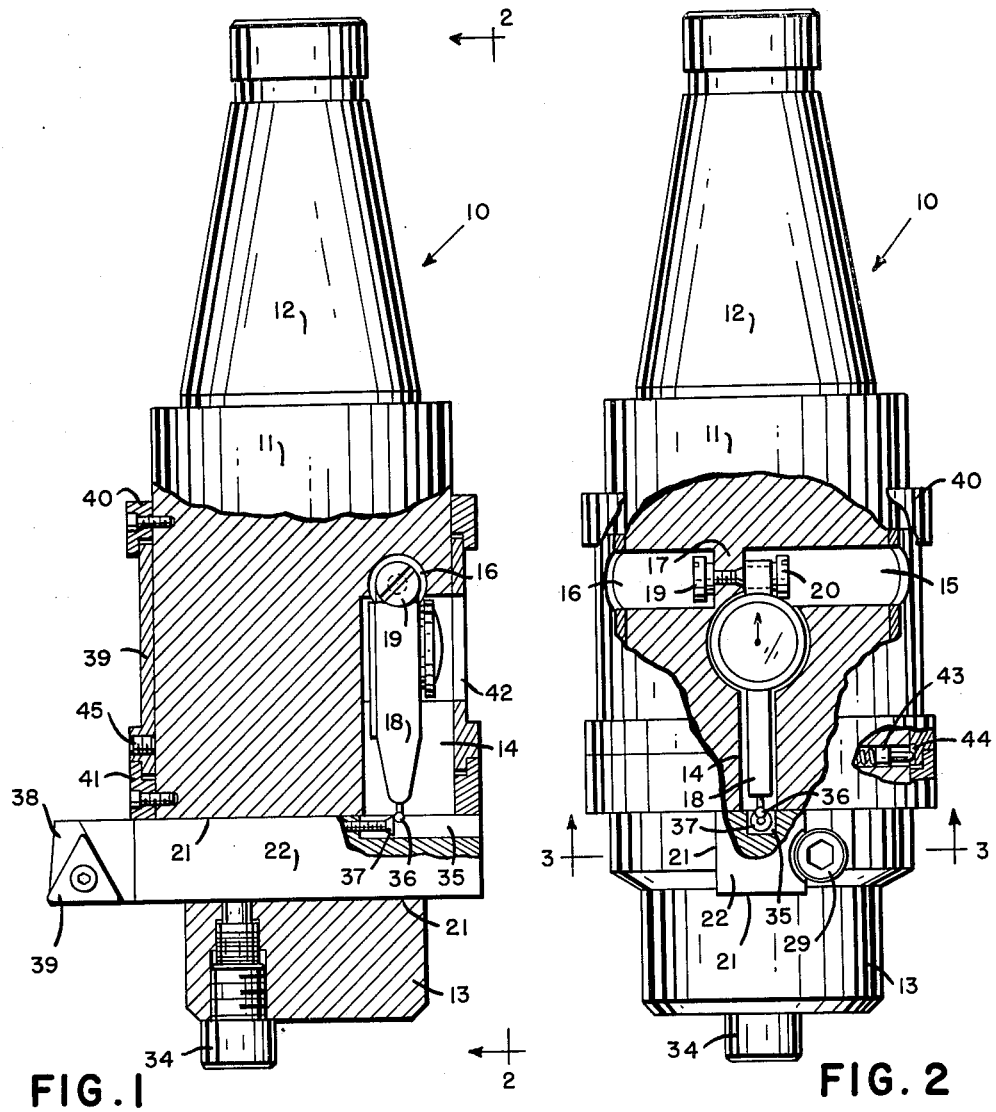
FIG. 1 is a sectional view of a boring bar to which the principles of the invention have been applied.
FIG. 2 is a view taken along line 2—2 of FIG. 1.

Referring to the drawing, the principles of the invention are shown as applied to a boring bar 10 having a body portion 11 with a tapered end portion 12 for attachment to a spindle of a boring mill or the like. The end of bar 10 opposite the tapered end 12 is reduced in diameter at 13.

Body 11 of the bar 10 is provided with a pocket or recess 14 which may be milled or otherwise formed therein, and near the upper end of said recess, aligned chordal bores 15 and 16 may be provided which form a support 17 to which a gauge 18 may be attached by threaded elements 19 and 20.

The body 11 may also include a transverse passage 21 of square cross section adapted slidingly to receive a shank 22 of a cutting tool. The location of the passage 21 is such that it opens into recess 14 for a purpose to be described later.

Figure 3:
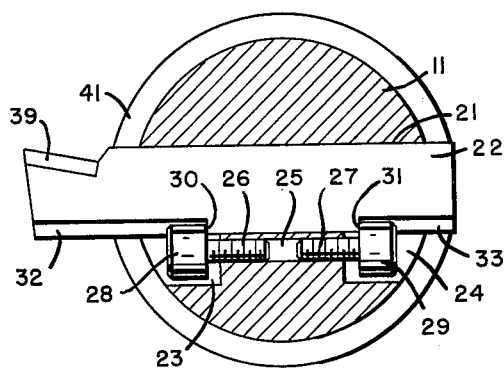
FIG. 3 is a sectional view taken substantially along line 3—3 of FIG. 2.

Referring to FIG. 3, the body 11 is provided with aligned bores 23 and 24 and a joining threaded passage 25. The bores 23 and 24 open into passage 21 and receive screws 26, 27, a peripheral portion of the heads 28, 29 of which extend into passage 21 and cooperate with shoulders 30, 31 formed on one side wall of shank 22 by milled recesses 32 and 33. The arrangement is such that loosening one of screws 26, 27 and tightening the other axially adjusts the position of shank 22 within passage 21. Shank 22 may be locked in adjusted position by a locking screw 34 threaded into the end 13 of bar 10.

Referring to FIG. 1, the one surface of shank 22 adjacent recess 14 may include a slot 35 within which the pivotal indicating finger 36 of the gauge 18 extends. An adjusting screw 37 having a self-locking thread arrangement may be threaded into the end wall of slot 35 for cooperation with the finger 36.

The end of shank 22 opposite that including slot 35 may be provided with a seat 38 for receiving a throw-away cutting tip 39. There may be provided a group of shanks 22 of different effective length so as to cover a substantial range of holes to be bored. The adjustable screw 37 in slot 35 provides a means for permitting each tool to cover a range of adjustment between adjacent shanks within the group.

In order to prevent dirt and chips from affecting the gauge 18, a tubular door 39 may be mounted on body 11 between track means 40, 41. Door 39 may include an opening 42 which, when aligned with recess 14, permits access to the gauge 18. A spring pressed detent 43 may cooperate with recesses 44 in door 39 to maintain the door in open and closed position, and a set screw 45 may be employed to lock it in a desired position.

Although the various features of the improved boring bar have been shown and described in detail to fully disclose one embodiment of the invention, it will be evident that changes may be made in such details and certain features may be used without others without departing from the principles of the invention.

What is claimed is:

1. In a boring bar, a body portion; means at one end of said body portion for connecting said bar to a spindle; walls defining a transverse passage through said bar near the end thereof opposite said connecting means; a tool shank having a cutting tip at one end adapted to be mounted within said transverse passage; walls defining a recess within the confines of said body portion and communicating with said transverse passage; indicating gauge means including an indicating finger, mounted within said recess such that the indicating finger extends into said transverse passage; means on said shank for cooperating with said indicating finger of said gauge; and slidable door means on said body portion for providing access to, and closing said recess within said body portion.

2. In a boring bar, a body portion; means at one end of said body portion for connecting said bar to a spindle; walls defining a transverse passage through said bar near the end thereof opposite said connecting means; walls defining a recess within the confines of said body portion, which recess communicates with said transverse passage; a tool shank having a cutting tip at one end and an element at its other end adapted to be adjusted axially of said shank, said shank being adapted to be mounted within said transverse passage with said adjustable element extending into said recess; indicating gauge means including an indicating finger mounted within said recess such that the indicating finger of said gauge extends into said transverse passage in line with said adjustable element; and means on said body portion for preventing dirt and chips from affecting said indicating gauge means and said adjustable element.

References Cited by the Examiner
UNITED STATES PATENTS
2,649,783   8/1953   Baugh _____ 33—185 X
3,044,322   7/1962   George.

WILLIAM W. DYER, JR., *Primary Examiner.*